UNITED STATES PATENT OFFICE.

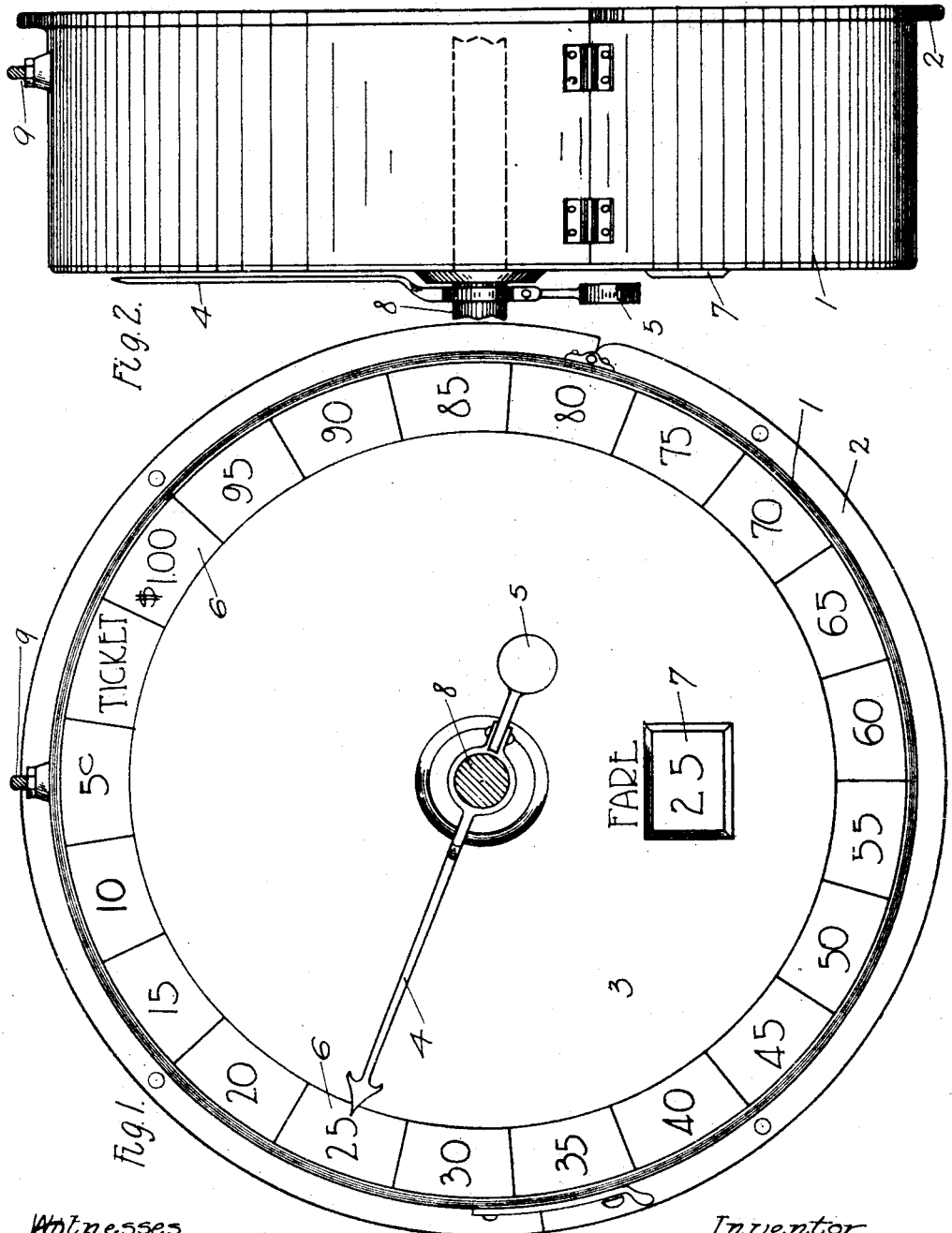

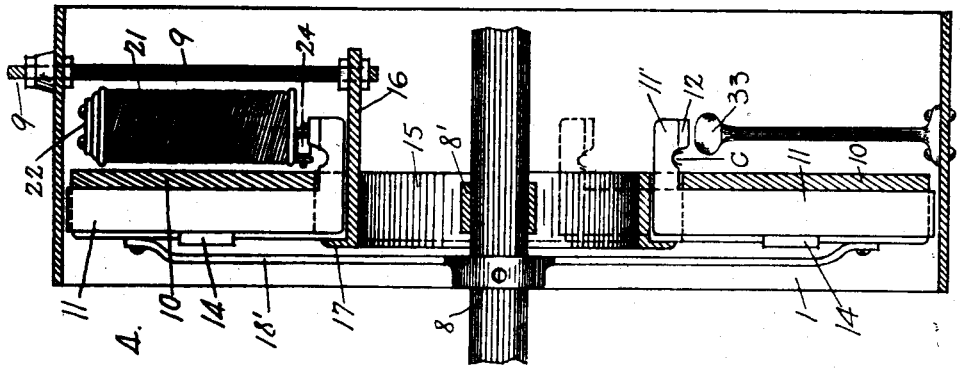
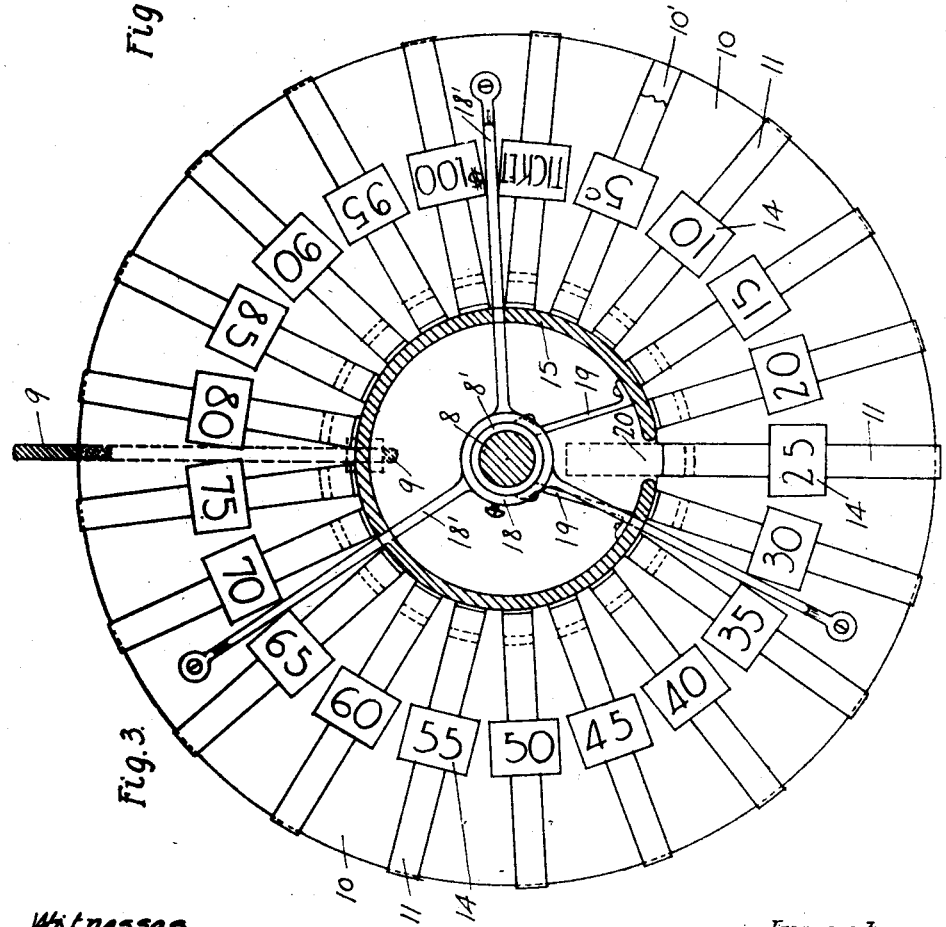

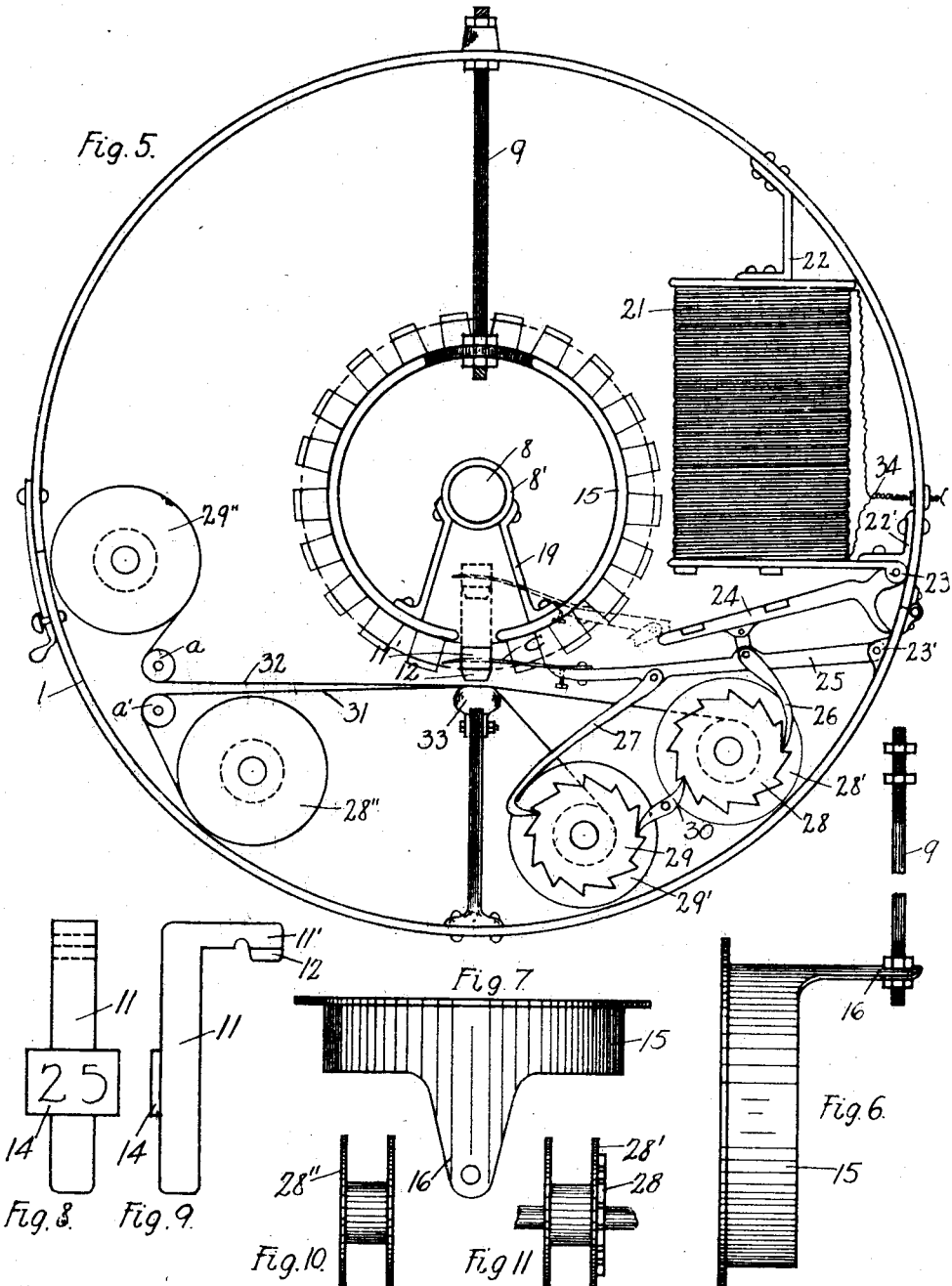

CREED C. FRUM, OF CLARKSBURG, WEST VIRGINIA.

FARE INDICATOR AND RECORDER.

1,209,280.     Specification of Letters Patent.     Patented Dec. 19, 1916.

Application filed September 30, 1915. Serial No. 53,372.

*To all whom it may concern:*

Be it known that I, CREED C. FRUM, a citizen of the United States, residing at Clarksburg, in the county of Harrison and State of West Virginia, have invented certain new and useful Improvements in Fare Indicators and Recorders, of which the following is a full specification.

This invention comprehends new and useful improvements in fare-indicators and recorders for use in passenger cars.

The main object of my invention is the production of an electrically operated fare-indicator and recorder which will visibly indicate the amount of cash fare paid by the passengers and tickets collected by the slight turning of a rod by the conductor or collector, and the recording of the amount of each fare paid, by an electrical device operated by means of a push-button system conveniently mounted on the same rod, which extends the length of the car.

Another object is to provide an indicating and recording machine of inexpensive, practical, and durable construction, and made otherwise commercially desirable.

With the above and other objects in view, as will more fully appear as the description proceeds, it will be observed that the invention consists in certain constructions, arrangements, and combinations of materials and parts, as hereinafter fully described, illustrated and claimed; but it is understood that various changes may be made in the construction, arrangements, and operation of parts of this invention without departing from the spirit and intent thereof.

I attain these objects by means of the construction and mechanism illustrated in the accompanying drawings, in which:

Figure 1 represents a front elevation of the fare-indicating and recording machine, which is inclosed within a circular-formed case. Fig. 2 is a side elevation of the machine, having the center shaft broken off, back and front. Fig. 3 represents a detailed front elevation of the inner disk, which carries the fare indicators and revolves within the case, immediately back of the face thereof. Fig. 4 designates a vertical section of the machine, showing the relation and position of the disk and other inner parts. Fig. 5 represents the interior rear elevation of the recording device. Fig. 6 is a side elevation of the ring journal, upon which the disk is mounted. Fig. 7 is a top view of the ring journal. Fig. 8 is a front elevation of the sliding, indicating and recording member. Fig. 9 is a side elevation of the said sliding member. Fig. 10 designates one of the interchangeable tape spools. Fig. 11 designates one of the interchangeable spools mounted on its shaft and attached to the side of the ratchet wheel.

Referring to the drawings, similar numerals and similar letters refer to similar parts throughout the several views.

In the drawings, numeral 1 designates the case, of a compact, circular design, within which the various devices of the machine are electrically operated.

2 represents the flange or back of the case, by means of which the fare-indicator is attached to the desired place within the car.

3 represents the face of the fare-indicator, having a multiplicity of numerals 6 spaced apart at its outer rim, which indicates the different fares or tickets collected.

4 is a pointer rigidly attached to the rod or shaft 8 and turns with it.

5 is the counter weight on the pointer.

7 designates a glass in the face of the case, through which the different fares will be visible when the same numeral is indicated by the pointer.

8 is a rod or shaft which may extend the entire length of the car, passing through the center of the fare-indicator, and upon which a part of the interior mechanism is mounted.

10 designates the inner disk, slightly smaller in diameter than the case, and having a large center opening and a multiplicity of slots 10' spaced apart on the outer face, and extending from the outer to the inner edge of the said disk. This disk can be made to indicate and record fares of from five cents to one dollar, or more.

11 designates a multiplicity of sliding members designed to closely fit and engage the slots 10' in the said disk, and having an inwardly projecting portion 11' at the center opening of the disk.

12 is a type block rigidly attached to the lower side of the inwardly projecting portion 11' of the sliding members. The figures on the face of the type block will be in accordance with the printed record which the sliding member is designed to make.

14 designates the multiplicity of fare numerals which are rigidly attached in a suitable position upon the face of the sliding members 11, as shown in Fig. 3.

15 designates a stationary ring journal, having an inwardly projecting arm 16 and an outer flange 17, and being centrally located within the case and held in a rigid position in relation to the outer case and the shaft 8 by means of ring 8', supporting hanger 9, and braces 19. The upper end of this said supporting hanger is rigidly attached to the upper portion of the case, and the lower end is rigidly attached to the inwardly projecting arm 16, as shown in Fig. 4. It will be observed that disk 10 is mounted upon and revolves around ring journal 15.

Numeral 18 represents a hub rigidly attached to shaft 8, having outwardly projecting arms 18', the outer ends of which are rigidly attached to the face of the disk 10, by means of which disk 10, shaft 8, and indicator 4 are kept in an unvarying, definite relation to each other, the said disk and pointer turning with the shaft.

20 designates an open passageway through the lower part of ring journal 15, through which the sliding members 11 pass as they are respectively raised to the point indicated by the dotted lines $a$, as shown in Figs. 3 and 4.

21 designates an electro-magnetic pick-up device rigidly attached to the outer case by means of brackets 22 and 22'. To the lower end of the magnet is pivotally attached by hinge 23 the magnetic pick-up lever 24. To the under side of said lever 24 is attached ratchet lever 25, having ratchet pawls 26 and 27 pivotally attached thereto, which pawls respectively engage the notches of the ratchet wheels 28 and 29. The ratchet lever 25 is pivotally attached to the case by means of hinge 23'. To the inwardly extending end of said ratchet lever 25 is rigidly attached spring $c$, which is designed to pass under and engage the inwardly extending portions 11' of the sliding members 11, as shown in Figs. 4 and 5.

30 is a ratchet lock, centrally pivoted between ratchet wheels 28 and 29 and designed to engage the ratchet notches, thereby preventing the ratchet tape spools from turning while the ratchet pawls are moving back to the next notch.

Numeral 31 designates a paper tape upon the surface of which the fares are recorded, in a manner similar to that employed in adding machines.

32 designates an ink tape, by means of which the record is made on paper tape 31.

33 designates the pad over which the tapes pass and rest when the sliding member drops for making a record on the paper tape. The pad has a downwardly extending support which is rigidly attached to the lower end of the case. It will be observed that tapes 31 and 32 are wound upon spools 28'' and 29'', the ends of said tapes passing over idlers $a$ and $a'$, and extending over pad 33. The said tapes are connected to interchangeable tape spools 28' and 29', which are mounted upon carrier shafts and the sides of the ratchet wheels 28 and 29 for winding. When the ink tape 32 is nearly all wound on tape spool 28'' these tape spools can be easily reversed in their position, and by means of the ratchet mechanism the ink tape is wound back on the other spool while still being used. When the paper tape 31 is all wound off of tape spool 29'' to spool 29' the used recorded paper tape is removed for reference, and a new roll of paper tape can be attached to the same spools upon which further records of fares are made.

34 designates the electric current wires to which connection is made with the push-button system, through which the electric current is supplied to the electro-magnet.

In the operation of my invention it will be understood that the fare-indicator and recorder will be located at the end of the car in plain view. The shaft or rod 8, passing through the machine, extends the entire length of the car, supported by brackets and within easy reach of the conductor or fare-collector. Mounted upon rod 8 at convenient points there will be push-button cases and handles encircling the rod for turning it. When the conductor collects a fare to a given station, the amount of which may be 25 cents, he turns the rod either forward or backward until the pointer is directed to "25" on the face of the machine. With this operation the inner disk 10 turns to the point where "25" on the sliding member 11 is visible through the glass 7. This will indicate that a 25-cent fare has been collected. The conductor will then push the button adjacent to the handle he has just turned, thereby turning the electric current into the electro-magnetic pick-up which raises the lever 24. This in turn raises the ratchet lever 25, the end of which extends under the inwardly projecting portion of the sliding member 11, raising the said member to the point indicated by the dotted lines $a$, as shown in Figs. 4 and 5; and by the upward motion of lever 25, to which ratchet pawls 26 and 27 are attached, pawl 27 will rotate the ratchet wheel 29 the distance of one notch, while pawl 26 moves backward and engages another notch on ratchet wheel 28. By this operation of the mechanism the paper tape 31 is slightly wound on the tape spool, thus placing an unused portion of the tape under the type block. When the push button is released the said levers and sliding member immediately drop back to their lowest position, the type block of the sliding member striking the ink tape 32 with just sufficient force to print the numeral thereon, upon the paper tape. The sliding member 11 will then be slightly raised by means of spring $c$, thereby removing the pressure of the sliding member from the tapes. By the repeating of this operation the different fares for a given trip or time, including tickets collected, are all printed upon the tape, after which the paper tape can easily be removed and a fresh one put in its place. It is further observed that the lower half of the case rim and the lower half of the back of said case are rigidly attached to each other and the attaching to the upper half of the case rim by means of hinge $d$ and latch hook $e$. By releasing the latch hook the lower half of the case rim and back to which ratchet wheels, spools and tapes are attached will swing downward of their own weight by means of hinge $d$, for the convenient removing, reversing or changing of the tapes and spools. This portion of the case is then raised to its former closed position, ready for use as shown and described.

Having fully described my invention what I claim as new and desire to secure by Letters Patent is:

1. A fare indicating and recording machine of the character described, comprising a case having an outer face with fare numerals on the rim thereof and a shaft extending through the center of the said case, a stationary ring support encircling said shaft and centrally suspended within said case and having an open space extending crosswise at the bottom of said ring support, a rotating disk rigidly mounted upon the said shaft, and having a plurality of straight slots spaced apart equal distances from each other upon the face of said disk, the said slots extending from the outer rim of said disk in a central direction to the ring support having, sliding, type-bearing members engaging said slots, and means for turning and rotating said disk around the said ring support substantially as described.

2. A fare indicating and recording machine of the character described, comprising a case having a shaft extending through the center of said case, a ring disk support within said case, a rotating disk mounted on said shaft, and having a plurality of straight slots upon the face of said disk, a plurality of sliding indicating and recording members, which engage the slots of said disk for sliding within said slots, and having inwardly projecting type-bearing portions on the inner end of said sliding members which respectively engage the slot at the bottom of the ring support, and means for raising and dropping by gravitation the said sliding members for indicating and recording fares as shown and set forth.

In testimony whereof I affix my signature, in the presence of two witnesses.

CREED C. FRUM.

Witnesses:
G. H. DUTHIE,
E. C. FRUM.

Copies of this patent may be obtained for five cents each, by addressing the "Commissioner of Patents, Washington, D. C."